(12) United States Patent
Mazzitelli et al.

(10) Patent No.: US 11,416,367 B2
(45) Date of Patent: *Aug. 16, 2022

(54) LINKING COMPUTING METRICS DATA AND COMPUTING INVENTORY DATA

(71) Applicant: Red Hat, Inc., Raleigh, NC (US)

(72) Inventors: John Joseph Mazzitelli, Sicklerville, NJ (US); Jay Shaughnessy, Mt. Laurel, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,617

(22) Filed: Jun. 16, 2021

(65) Prior Publication Data

US 2021/0311847 A1 Oct. 7, 2021

Related U.S. Application Data

(63) Continuation of application No. 15/899,317, filed on Feb. 19, 2018, now Pat. No. 11,068,372.

(51) Int. Cl.
*G06F 11/30* (2006.01)
*H04L 41/06* (2022.01)

(52) U.S. Cl.
CPC ...... *G06F 11/3048* (2013.01); *G06F 11/3006* (2013.01); *G06F 11/3065* (2013.01); *H04L 41/06* (2013.01)

(58) Field of Classification Search
CPC ............. G06F 11/3048; G06F 11/3006; G06F 11/3065; G06F 11/3051; G06F 11/3452; H04L 41/06; H04L 41/22; H04L 43/08; H04L 41/046; Y02D 10/00
See application file for complete search history.

(56) References Cited

U.S. PATENT DOCUMENTS

| | | | |
|---|---|---|---|
| 9,118,538 B1 | 8/2015 | Lekkalapudi et al. | |
| 9,378,111 B2 | 6/2016 | Ramesh Coimbatore et al. | |
| 9,514,387 B2 | 12/2016 | Eaton | |
| 2008/0027834 A1 | 1/2008 | Meyer et al. | |
| 2008/0189632 A1* | 8/2008 | Tien | G06Q 30/02 702/182 |
| 2008/0270077 A1* | 10/2008 | Ozonat | G06F 11/3409 702/186 |
| 2012/0317266 A1* | 12/2012 | Abbott | G06Q 30/0278 709/224 |

(Continued)

OTHER PUBLICATIONS

Brattstorm et al, Scalable Agentless Cloud Network Monitoring, Department of Computer Science, 2017 (Year: 2017).*

(Continued)

*Primary Examiner* — Javier O Guzman
(74) *Attorney, Agent, or Firm* — Womble Bond Dickinson (US) LLP

(57) ABSTRACT

A method includes appending contextual information and identification information of the computing inventory data to time series data of computing metrics data to generate a relationship indication. The method further includes providing the relationship indication to be displayed via a graphical user interface of a client device in response to a request, wherein the relationship indication comprises a plurality of links between the computing inventory data and the computing metrics data.

20 Claims, 4 Drawing Sheets

(56) References Cited

U.S. PATENT DOCUMENTS

| | | | |
|---|---|---|---|
| 2013/0204911 A1* | 8/2013 | Chaterjee | G06F 16/22 |
| | | | 707/812 |
| 2014/0229698 A1 | 8/2014 | Sivasubramanian et al. | |
| 2014/0229768 A1 | 8/2014 | Bernstein et al. | |
| 2018/0068228 A1* | 3/2018 | Rawlings | G06F 11/3433 |
| 2018/0089188 A1* | 3/2018 | Kharisma | G06F 16/90335 |
| 2019/0081907 A1 | 3/2019 | Gopalakrishnan | |
| 2019/0268242 A1* | 8/2019 | Sullivan | H04L 41/20 |
| 2019/0312800 A1* | 10/2019 | Schibler | G06F 8/65 |
| 2020/0034216 A1* | 1/2020 | Kolodzieski | G06F 8/60 |

OTHER PUBLICATIONS

"Enabling Cluster Metrics," OpenShift Container Platform 3.5, retrieved from https://docs.openshift.com/container-platform/3.5/install_config/cluster_metrics.html on Jan. 2, 2018, 9 pages.

"Hawkular WildFly Agent API for your Own Inventory and Metrics," Thoughts from a Management Platform Developer, Jan. 1, 2016, retrieved from http://management-platform.blogspot.in/2016/01/hawkular-wildfly-agent-api-for-your-own.html; 2 pages.

Mazzitelli, John, "Collecting Prometheus Data and Storing in Hawkular," Jul. 12, 2016, retrieved from http://planet.iboss.org/post/collecting_prometheus_data_and_storing_in_hawkular, 4 pages.

Red Hat, Inc., "Metrics and Measurements", Red Hat Customer Portal, retrieved from https://access.redhat.com/documentation/en-us/red_hat_jboss_operations_network/3.1/html/admin_setting_up_monitoring_alerts_and_operations/monitoring-and-events on Jan. 2, 2018, 12 pages.

\* cited by examiner

LINKING COMPUTING METRICS DATA AND COMPUTING INVENTORY DATA

RELATED APPLICATIONS

This application is a continuation of U.S. patent application Ser. No. 15/899,317, filed Feb. 19, 2018, which is herein incorporated by reference in its entirety.

TECHNICAL FIELD

Aspects of the present disclosure relate to computing metrics data collection, and more particularly, to linking computing metrics data with computing inventory data.

BACKGROUND

Metrics data collections systems, generally include an open-source or close-source system monitoring and alerting system used for monitoring, for example, computing devices, web services, micro-services, and other computing resources that may be included in a cloud-based network. For example, the metrics data collections systems may generally include a server that collects metrics data from a number of computing resources at regular intervals and store the metrics data locally. The metric data may be later called from one or more processing nodes and provided to be presented to, for example, a developer or other user.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
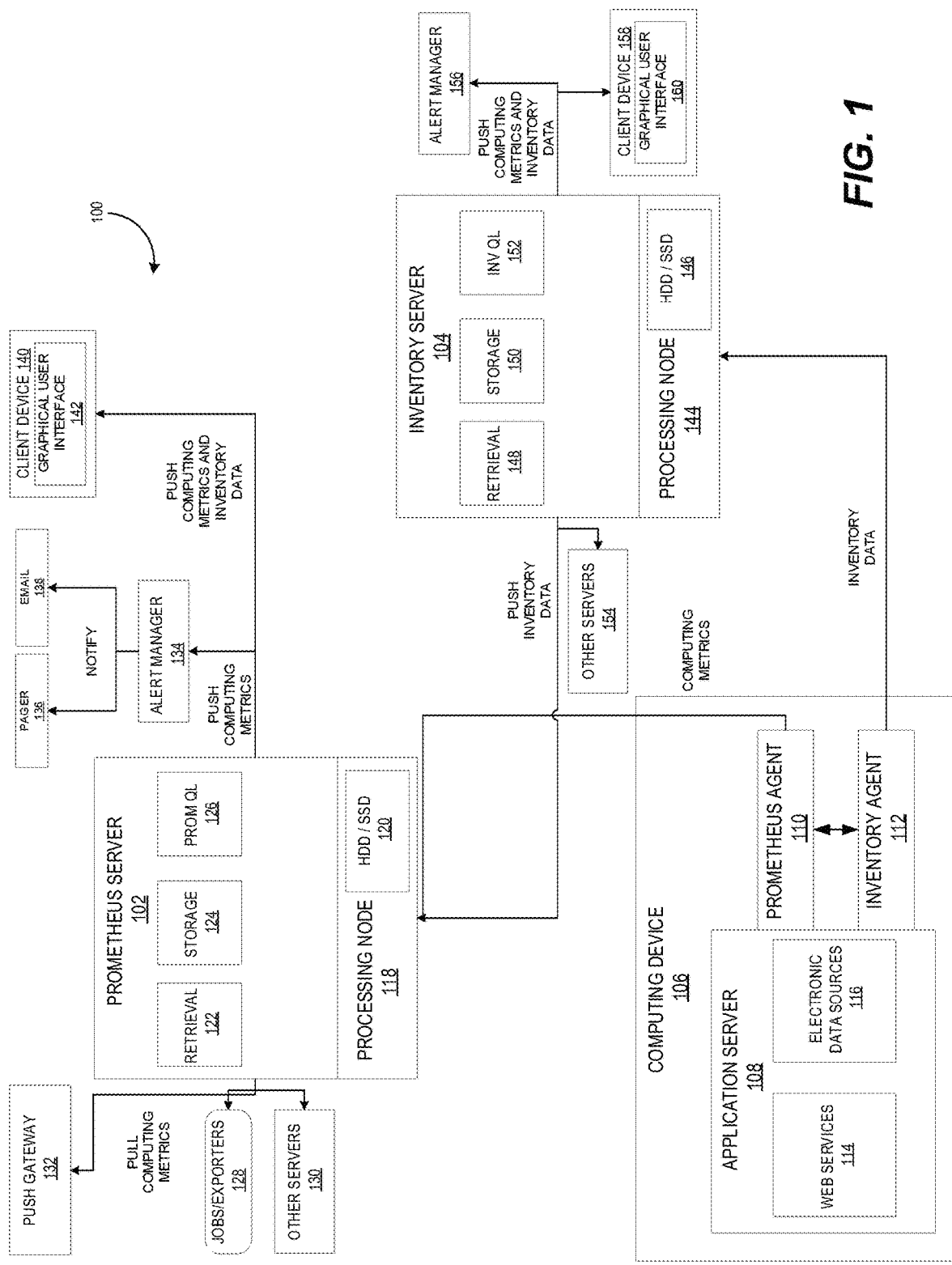
FIG. 1 is a block diagram illustrating an example metrics and inventory data collection architecture, in accordance with the present embodiments.

The Prometheus™ monitoring system, or other similar metrics data collections systems, generally includes an open-source or close-source system monitoring and alerting toolkit used for monitoring, for example, computing devices, web services, micro-services, and other computing resources that may be included in a cloud-based network. For example, the Prometheus™ architecture may generally include a server that collects metrics data from a number of computing resources and stores that metrics data. The Prometheus™ server operates by "scraping," or calling the metrics data endpoints of the various computing resources the Prometheus™ server is being utilized to monitor. In at least some instances, the Prometheus™ server may collect the metrics data at regular intervals and store the metrics data locally. The Prometheus™ server may then later pull the metrics data from one or more processing nodes, which may run one or more specific modules that extract the metrics data and translate the metrics data into, for example, a Prometheus™ format that can be consumed by the Prometheus™ server. The Prometheus™ server may then provide the translated metrics data to be presented to, for example, a developer or other user. Unfortunately, the Prometheus™ server may not provide any indication of the context or identification of the computing resources of which the Prometheus™ server is being utilized to monitor. It may be thus useful to provide techniques to link collected computing metrics data associated certain monitored computing resources with the proper contextual and unique identification information of the monitored computing resources.

Accordingly, as will be further appreciated below, the present embodiments may include providing a metrics data server and a metrics data agent that collect and store computing metrics data associated with various monitored computing resources, and, additionally or in conjunction with, an inventory data server and an inventory data agent that collect and store computing inventory data (e.g., contextual and identification information associated with the monitored computing resources). For example, the computing inventory data captured by the inventory data agent and collected and stored by the inventory data server may include, for example, contextual information (e.g., physical location, virtual location, configuration, configuration settings, hardware and software compatibilities, hardware and software compatibilities, network configuration, installation date, connections and communications with other components and services of the network, and so forth) and identification information (e.g., name, unique identification, serial number, manufacturer name, software version, user authorization, user authentication, and so forth) for each of various monitored computing resources.

In some embodiments, the inventory data server may push the collected and stored computing inventory data out to, for example, the metrics data server or directly to a client device to be presented on a graphical user interface (GUI) of the client device. The metrics data server may combine collected and stored computing metrics data and the computing inventory data received from the inventory data server. The metrics data server may then push the combined computing metrics data and computing inventory data to a client device to be presented on a GUI of the client device, for example, in response to a request from a developer or other user. For example, the GUI may be included to present a visualization of the monitored computing resources and may be interacted with by a developer or other user. In this way, the present techniques may provide a hierarchical relationship between the computing metrics data collected and stored by the metrics data server and the computing inventory data collected and stored by the inventory data server.

With the foregoing in mind, it may be useful to describe a metrics data and inventory data collection system, such as a metrics data and inventory data collection system 100 as illustrated in FIG. 1. As depicted by FIG. 1, the metrics data and inventory data collection system 100 may include a metrics data server 102 (e.g., "Prometheus™ Server"), an inventory data server 104 (e.g., "Inventory Server"), and a computing device 106. In some embodiments, the metrics data and inventory data collection system 100 may include a cloud-based computing architecture or other similar computing architecture in which the metrics data server 102 and the inventory data server 104 useful in providing computing metrics data and computing inventory data for monitoring and alerting during, for example, operation of the computing device 106.

In certain embodiments, as further depicted, the computing device 106 may include application server 108, a metrics data agent 110 (e.g., "Prometheus™ Agent"), and an inventory data agent 112 (e.g., "Inventory Agent"). It should be appreciated that a single computing device 106 is included merely for the purpose of illustration, in real-world implementation, the metrics data and inventory data collection system 100 may include any number (e.g., hundreds) of computing devices 106 to be monitored. For example, the computing device 106 may include a general computing server, a bare-metal server, a webhost server, a virtual machine, a virtual server, an embedded device, a database, a gateway, a hypervisor, a host computing device, a load balancer, a communication resource, or any of various other system components that may be included in a cloud-based network.

In certain embodiments, the application server 108 may include any service or application that may run on the computing device 106. For example, in one embodiment, the application server 108 may include an operating system (OS), or any other system or service in which one or more web applications (e.g., web services 114) and/or desktop or mobile applications (e.g., electronic data sources 116). In certain embodiments, as further depicted in FIG. 1, the metrics data agent 110 (e.g., "Prometheus™ Agent") and the inventory data agent 112 (e.g., "Inventory Agent") may be operatively coupled to the application server 106. The metrics data agent 110 and the inventory data agent 112 may each include agents or other exporters that may be used to scrape, for example, the application server 106 (e.g., or other "endpoint" or source of metrics that may be scraped) and the convert the collected computing metrics data and computing inventory data to expose the data in a format (e.g., Prometheus™ format) that can be consumed and processed by the metrics data server 102 and the inventory data server 104.

For example, in some embodiments, the metrics data server 102 and the inventory data server 104 may process and store computing metrics data and computing inventory data as time-series, which may include, for example, a data stream of timestamped values each belonging to the same metric and the same set of labeled parameters. Specifically, the time-series may include data stream uniquely identified by the time-series' metric name and a set of key-value pairs (e.g., labels) indicating runtime metrics and similar data. As further illustrated, the metrics data agent 110 may scrape the application server 108, collecting and storing computing metrics data (e.g., computing resource utilization, storage capacity, bandwidth, execution times, response times, data throughput, latency, processing speed, channel capacity, power consumption, scalability, availability, number of active applications, and so forth).

The metrics data agent 110 may then push the computing metrics data to the metrics data server 102. As depicted, the metrics data server 102 may include a processing node 118 and on-board memory 120 (e.g., hardware disk drive [HDD], solid-state drive [SDD]). The processing node 118 may be utilized to process and analyze the incoming computing metrics data. The metrics data server 102 may also include a retrieval component 122, a storage component 124, and a Prometheus™ Query Language component 126 (e.g., "PromQL"). The retrieval component 122 may be used to retrieve specific or requested computing metrics data from, for example, the on-board memory 120 and/or the storage component 124.

In certain embodiments, the Prometheus™ Query Language component 126 (e.g., "PromQL") may include, for example, one or more query languages (QL) that may allow for various operations (e.g., data aggregation, data slicing and dicing, prediction and join operations, and so forth) to be performed by the processing node 118. As further illustrated in FIG. 1, the metrics data server 102 may also be operatively coupled to a jobs/exporters component 128, other servers 130 (e.g., additional Prometheus™ servers), and a push gateway 132. The jobs/exporters component 128, which may include, for example, a collection of targets monitoring a number of similar processes replicated for scalability or reliability, may pull computing metrics data from the metrics data server 102.

Thus, in one embodiment, the jobs/exporters component 128 may use the computing metrics data captured, for example, by the metrics data agent 110 and processed by the metrics data server 102 as a comparison or other basis to monitor other systems such as other servers 130 (e.g., additional Prometheus™ servers). Similarly, to monitor other components that may not be readily scraped, the push gateway 132 may pull the computing metrics data from the metrics data server 102 and may be used to push the computing metrics data (e.g., time-series data) from, for example, short-lived service-level batch jobs to an intermediary job that may be scraped by the metrics data server 102.

As further illustrated, in some embodiments, the metrics data server 102 may push computing metrics data as alerts to an alert manager 134, which may provide alerts and/or other notifications via, for example, pager service 136 and email service 138. Specifically, the alert manager 134 may receive alerts from the metrics data server 102 based on the computing metrics data, and may aggregate the alerts into, for example, groups, de-duplicates, applies silences, throttles, and so forth. The alert manager 134 may then send out notifications to the pager service 136 (e.g., PagerDuty alerts, Slack alerts) and the email service 138 (e.g., emails, text messages, attachments). As will be further appreciated below, in some embodiments, the metrics data server 102 or the inventory server 104 may combine computing metrics data with computing inventory data received and push the combined computing metrics data and computing inventory data to a client device 140 to be presented on a graphical user interface (GUI) 142, for example, in response to a request from a developer or other user.

In certain embodiments, in addition to the metrics data server 102 collecting and storing the computing metrics data of, for example, the application server 108, it may be useful to collect and store computing inventory data by way of the inventory data agent 112 and the inventory data server 104. Specifically, as will be further appreciated, the computing inventory data captured by the inventory data agent 112 and collected and stored by the inventory data server 104 may include, for example, contextual information (e.g., physical location, virtual location, configuration, configuration settings, hardware and software compatibilities, hardware and software compatibilities, network configuration, installation date, connections and communications with other components and services of the network, and so forth) and identification information (e.g., name, unique identification, serial number, manufacturer name, software version, user authorization, user authentication, and so forth) for the application server 108 and the computing device 106. In this way, the present techniques may provide a hierarchical relationship between the computing metrics data collected and stored by the metrics data server 102 and the computing inventory data collected and stored by the inventory data server 104.

In some embodiments, the inventory data server 104 may push the collected and stored computing inventory data out to, for example, one or more separate inventory servers (e.g., other servers 154) and/or alert manager (e.g., 156) and client device (e.g., client device 158) in response to one or more requests received via a GUI 160. In other embodiments, the inventory data server 104 may push the collected and stored computing inventory data out to, for example, the metrics data server 102 to be ultimately pushed along with the computing metrics data to the client device 140.

For example, as previously discussed above, the metrics data agent 110 may be operatively coupled to the application server 106. The inventory data agent 112 may be used to scrape, for example, the application server 106 (e.g., or other "endpoint" or source of metrics that may be scraped) and the convert the computing inventory data to expose the data in a format (e.g., Prometheus™ format) that can be consumed and processed by the inventory data server 104. The metrics data agent 110 may then push the computing metrics data to the metrics data server 102. As depicted, the metrics data server 102 may include a processing node 144 and on-board memory 146 (e.g., HDD, SDD). The processing node 144 may be utilized to process and analyze the incoming computing inventory data. The metrics data server 102 may also include a retrieval component 148, a storage component 150, and an Inventory Query Language component 152 (e.g., "InvQL"). The retrieval component 122 may be used to retrieve specific or requested computing inventory data from, for example, the on-board memory 146 and/or the storage component 150. In certain embodiments, the Inventory Query Language component 152 (e.g., "InvQL") may include, for example, one or more query languages (QL) that may allow for various operations (e.g., data aggregation, data slicing and dicing, prediction and join operations, and so forth) to be performed by the processing node 144.

In certain embodiments, as previously discussed above, the inventory data server 104 may push the collected and stored computing inventory data out to, for example, one or more separate inventory servers (e.g., other servers 154) and/or alert manager (e.g., 156) and client device (e.g., client device 158) in response to one or more requests. In other embodiments, the inventory data server 104 may push the collected and stored computing inventory data out to, for example, the metrics data server 102 to be ultimately pushed along with the computing metrics data to the client device 140 to be presented on the GUI 142, for example. In this way, the inventory data agent 112 and the inventory data server 104 that may provide a hierarchical relationship between the computing metrics data collected and stored by the metrics data server 102 and the computing inventory data collected and stored by the inventory data server 104.

Specifically, as previously noted, the computing inventory data collected and stored by the inventory data server 104 may include specific contextual information (e.g., physical location, virtual location, configuration, configuration settings, hardware and software compatibilities, hardware and software compatibilities, network configuration, installation date, connections and communications with other components and services of the network, and so forth with respect to the computing device 106, application server 108, web services 114, electronic data resources 116) and identification information (e.g., name, unique identification, serial number, software version, manufacturer name, user authorization, user authentication, and so forth with respect to the computing device 106, application server 108, web services 114, electronic data resources 116) with respect to the computing metrics data, and, more specifically, a hierarchical relationship between the computing metrics data and the computing inventory data.

For example, in one embodiment, the hierarchical relationship between the computing metrics data and the computing inventory data may be provided by appending the Prometheus™ time-series data representing the computing metrics data to include additional computing inventory names and sets of key-value pairs or labels representing the computing inventory data in which all of the information about the monitored computing resources (e.g., application server 108 and computing device 106) of which the time-series data representing the computing metrics data have been captured from may be deduced. In other embodiments, the hierarchical relationship between the computing metrics data and the computing inventory data may be provided by appending the Prometheus™ time-series data representing the computing metrics data to include one or more pointer values representing the computing inventory data. In such an embodiment, the pointer values representing the computing inventory data may point to the contextual information and identification information of each of the monitored computing resources (e.g., application server 108, computing device 106, and other monitored computing resources) associated with the time-series data representing the computing metrics data.

In certain embodiments, as previously discussed above, the metrics data server 102 may combine computing metrics data with computing inventory data received from the inventory data server 104 and push the combined computing metrics data and computing inventory data to a client device 140 to be presented on the GUI 142 (or the GUI 160), for example, in response to a request from a developer or other user. For example, the GUI 142 may be included to present, for example, a visualization of the computing device 106, application server 108, and other monitored computing resources that may be interacted with by a developer or other user.

In some embodiments, the GUI 142 visualization of, for example, the computing device 106, application server 108, or other monitored computing resources may be presented as a parent-child hierarchy, a cluster hierarchy, a class hierarchy, a nested hierarchy, a tree structure, a structure chart, a Venn diagram, a spider diagram, a breadcrumb, or other similar visually-interactive representation of the computing inventory relationships and links between the monitored computing resources, as well as the associated computing metrics data (e.g., represented as metric graphs). For example, in one embodiment, the computing device 106 may represent a parent monitored computing resource in the visually-interactive hierarchy presented on the GUI 142, while the application server 108, which runs on the computing device 106, may represent a child monitored computing resource in the visually-interactive hierarchy.

Continuing the aforementioned example, the web services 114 and the electronic data resources 116 may represent child monitored computing resources with respect to, for example, the application server 106. A developer or other user, for example, may be able to then navigate through such a visually-interactive hierarchy presented on the GUI 142 and drill down (e.g., computing device 106>application server 108>web services 114) to, for example, a monitored computing resource of interest such as the web services 114. Utilizing the GUI 142, the developer or other user, for example, may then click a link or object associated with the web services 114 that would render the computing metrics data belonging to the web services 114.

Figure 2:
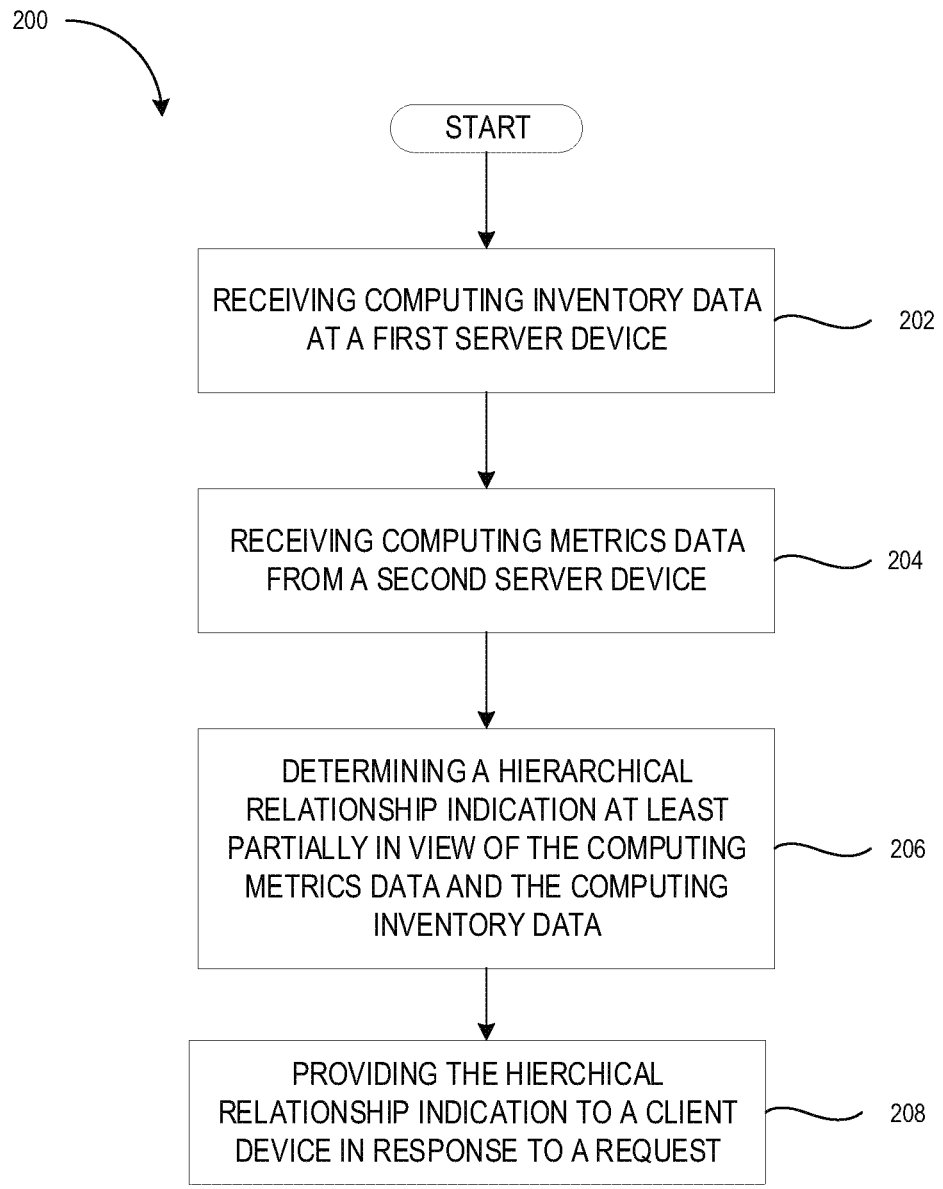
FIG. 2 is a flow diagram of a method of linking computing metrics data with computing inventory data, in accordance with some embodiments of the present disclosure.

Turning now to FIG. 2, which illustrates is a flow diagram of a method 200 of linking computer metrics data and computer inventory data in accordance with the present embodiments. The method 200 may also be performed by processing logic (e.g., processing node 118 of the metrics data server 102 or processing node 144 of the inventory data server 104) that may include hardware (e.g., circuitry, dedicated logic, programmable logic, one or more processors, one or more processing devices, a central processing unit (CPU), a system-on-chip (SoC), etc.), software (e.g., instructions running/executing on a processing device), firmware (e.g., microcode), or various combinations thereof.

The method 200 may begin at block 202 with a processing device (e.g., processing device 314) receiving computing inventory data at a first server device (e.g., first server device 302). The method 200 may continue at block 204 with the processing device (e.g., processing device 314) receiving computing metrics data from a second server device (e.g., second server device 304). The method 200 may then continue at block 206 with the processing device (e.g., processing device 314) determining a hierarchical relationship indication at least partially in view of the computing metrics data and the computing inventory data. The method 200 may then conclude at block 208 with the processing device (e.g., processing device 314) providing the hierarchical relationship indication to a client device (e.g., client device 318) in response to a request.

Figure 3:
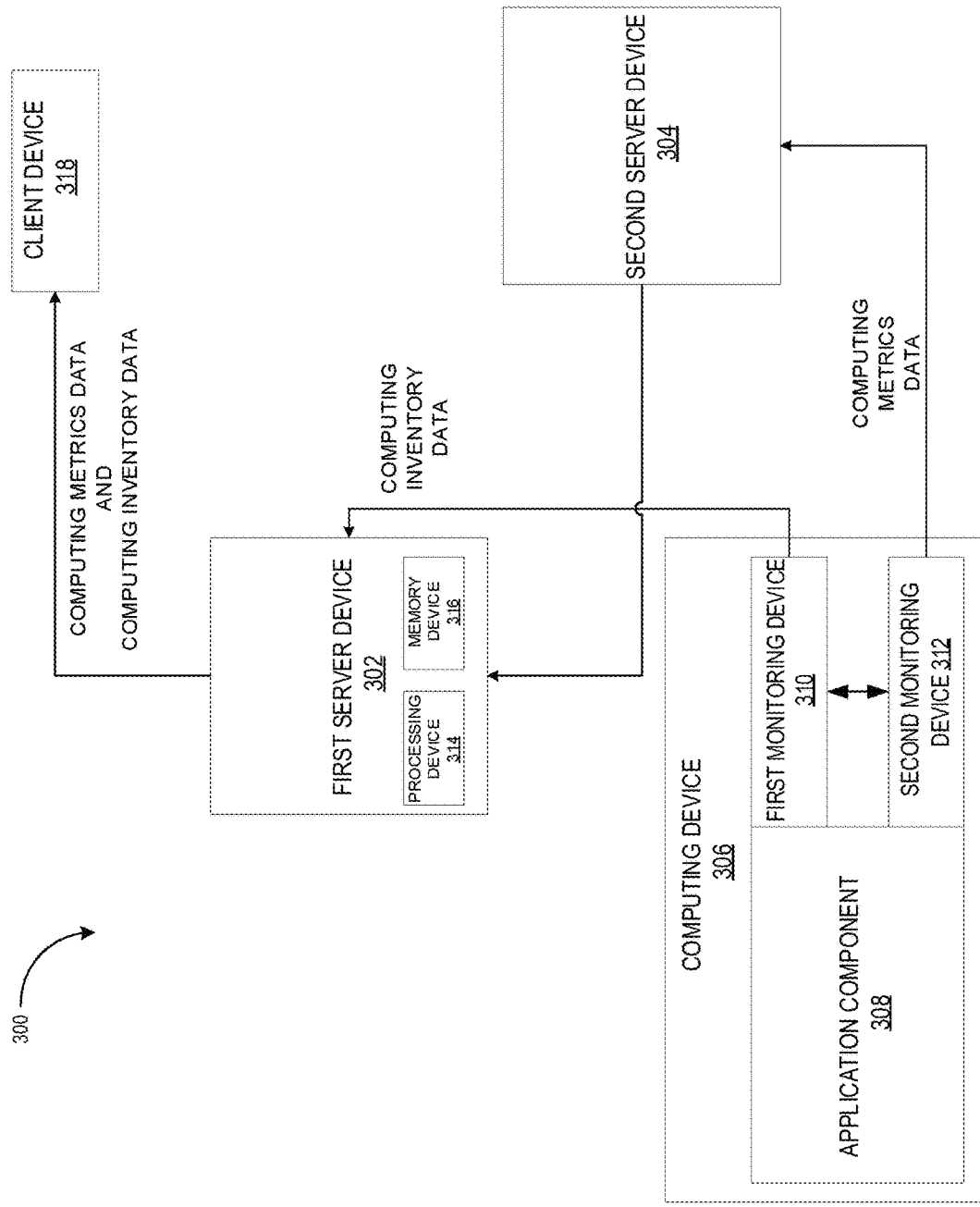
FIG. 3 is another block diagram illustrating an example metrics and inventory data collection architecture, in accordance with the present embodiments.

FIG. 3 illustrates an apparatus 300 for linking computer metrics data and computer inventory data in accordance with the present embodiments. As depicted, the apparatus 300 may include a first server device 302, a second server device 304, and a computing device 306. As depicted, the computing device 306 may include an application component 308 that may be monitored by a first monitoring device 310 and a second monitoring device 312. During operation, the first monitoring device 310 may capture computing inventory data associated with the application component 308, while the second monitoring device 312 may capture computing metrics data associated with the application component 308 and the computing device 306.

The first server device 302 may collect the computing inventory data from the first monitoring device 310. The second server device 304 may collect the computing metrics data from the second monitoring device 312. As further illustrated, the first server device 302 may then receive the computing metrics data from the second server device 304, and store the computing metrics data and the computing inventory data in a memory device 316. A processing device 314 of the first server device 302 may be then utilized to determine a hierarchical relationship based on the received and stored computing inventory data and the computing metrics data, in which the hierarchical relationship may indicate each link between the received and stored computing inventory data and the computing metrics data. The first server device 302 may then provide the hierarchical relationship indication to a client device 318 in response to a request, for example.

Figure 4:
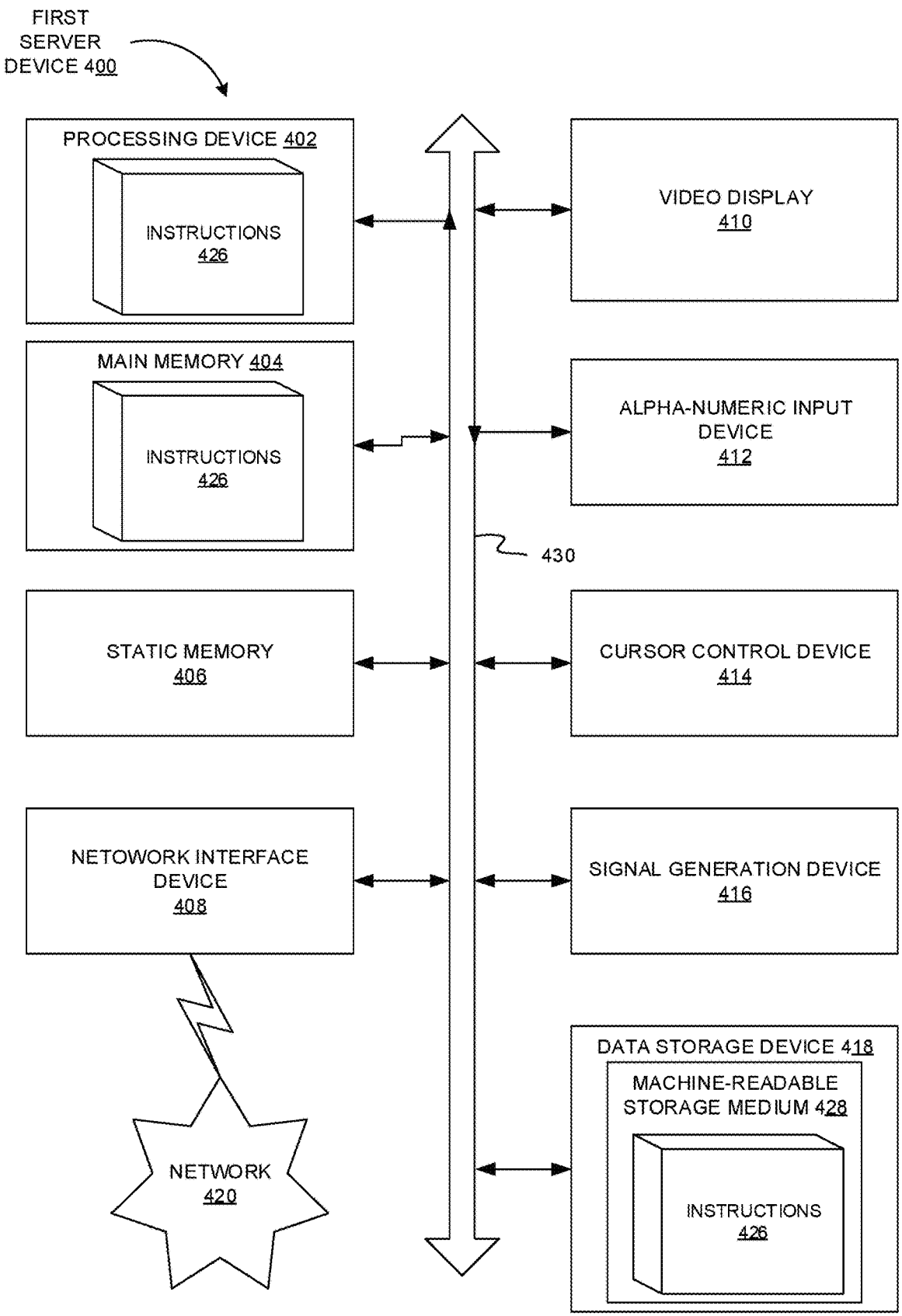
FIG. 4 is a block diagram of an example computing device that may perform one or more of the operations described herein, in accordance with the present embodiments.

FIG. 4 is a block diagram of an example first server device 400 that may perform one or more of the operations described herein, in accordance with some embodiments. The first server device 400 may be connected to other computing devices in a LAN, an intranet, an extranet, and/or the Internet. The first server device 400 may operate in the capacity of a server machine in client-server network environment or in the capacity of a client in a peer-to-peer network environment. The first server device 400 may be provided by a personal computer (PC), a set-top box (STB), a server, a network router, switch or bridge, or any machine capable of executing a set of instructions (sequential or otherwise) that specify actions to be taken by that machine. Further, while only a single first server device 400 is illustrated, the term "computing device" shall also be taken to include any collection of computing devices that individually or jointly execute a set (or multiple sets) of instructions to perform the methods discussed herein.

The example first server device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

The first server device 400 may further include a network interface device 408 which may communicate with a network 420. The first server device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

The data storage device 418 may include a computer-readable storage medium 428 on which may be stored one or more sets of instructions, e.g., instructions for carrying out the operations described herein, in accordance with one or more aspects of the present disclosure. Instructions implementing module 426 may also reside, completely or at least partially, within main memory 404 and/or within processing device 402 during execution thereof by first server device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc.

Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
a memory to store computing inventory data associated with one or more components of a computing device; and
a processing device operatively coupled to the memory, the processing device to:
append contextual information and identification information of the computing inventory data to time series data of computing metrics data to generate a relationship indication; and
provide the relationship indication to be displayed via a graphical user interface of a client device in response to a request, wherein the relationship indication comprises a plurality of links between the computing inventory data and the computing metrics data.

2. The apparatus of claim 1, wherein the processing device further to:
receive the computing inventory data from one or more components of the computing device, the computing inventory data collected via a first monitoring device associated with the one or more components of the computing device, wherein the computing inventory data comprises the contextual information and identification information of the one or more components of the computing device.

3. The apparatus of claim 1, wherein the processing device further to receive the computing metrics data from a server device, wherein the computing metrics data comprises the time series data collected by the server device via a second monitoring device associated with the one or more components of the computing device.

4. The apparatus of claim 1, wherein the apparatus comprises a Prometheus™ inventory data collection server.

5. The apparatus of claim 1, wherein the computing metrics data comprises one or more time-series indicating runtime metrics associated with the one or more components of the computing device.

6. The apparatus of claim 1, wherein the relationship indication comprises one or more pointer values indicating a nexus between the computing metrics data and the computing inventory data.

7. The apparatus of claim 1, wherein the first monitoring device comprises an inventory agent operatively coupled to the one or more components of the computing device.

8. The apparatus of claim 3, wherein the second monitoring device comprises a Prometheus™ agent operatively coupled to the one or more components of the computing device.

9. The apparatus of claim 3, wherein the server device is to determine the relationship indication at least partially in view of the computing metrics data and the computing inventory data and to provide the relationship indication to the client device in response to a second request.

10. The apparatus of claim 1, wherein the processing device is to provide the relationship indication to the client device in response to a request received via the graphical user interface presented on the client device.

11. A method, comprising:
appending contextual information and identification information of the computing inventory data to time series data of computing metrics data to generate a relationship indication; and
providing the relationship indication to be displayed via a graphical user interface of a client device in response to a request, wherein the relationship indication comprises a plurality of links between the computing inventory data and the computing metrics data.

12. The method of claim 11, further comprising receiving the computing inventory data from one or more components of the computing device, the computing inventory data collected via a first monitoring device associated with the one or more components of the computing device, wherein the computing inventory data comprises the contextual information and identification information of the one or more components of the computing device.

13. The method of claim 11, further comprising receiving the computing inventory data from one or more components of the computing device, the computing inventory data collected via a first monitoring device associated with the one or more components of the computing device, wherein the computing inventory data comprises the contextual information and identification information of the one or more components of the computing device.

14. The method of claim 11, wherein the computing metrics data comprises one or more time-series indicating runtime metrics associated with the one or more components of the computing device.

15. The method of claim 11, wherein the relationship indication comprises a nexus between the computing metrics data and the computing inventory data.

16. A non-transitory computer-readable storage medium including instructions that, when executed by a processing device, cause the processing device to:
append contextual information and identification information of the computing inventory data to time series data of computing metrics data to generate a relationship indication; and
provide the relationship indication to be displayed via a graphical user interface of a client device in response to a request, wherein the relationship indication comprises a plurality of links between the computing inventory data and the computing metrics data.

17. The non-transitory computer-readable storage medium of claim 16, further causing the processing device to receive the computing inventory data from one or more components of the computing device, the computing inventory data collected via a first monitoring device associated with the one or more components of the computing device, wherein the computing inventory data comprises the contextual information and identification information of the one or more components of the computing device.

18. The non-transitory computer-readable storage medium of claim 16, further causing the processing device to receive the computing metrics data from a server device, wherein the computing metrics data comprises the time series data collected by the server device via a second monitoring device associated with the one or more components of the computing device.

19. The non-transitory computer-readable storage medium of claim 16, wherein the computing metrics data comprises one or more time-series indicating runtime metrics associated with the application server and the computing device.

20. The non-transitory computer-readable storage medium of claim 16, further causing the processing device to determine a nexus between the computing metrics data and the computing inventory data to generate the relationship indication.

* * * * *